(12) United States Patent
Chen

(10) Patent No.: US 6,957,243 B2
(45) Date of Patent: Oct. 18, 2005

(54) BLOCK-SERIAL FINITE FIELD MULTIPLIERS

(75) Inventor: Chin-Long Chen, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 09/973,617

(22) Filed: Oct. 9, 2001

(65) Prior Publication Data

US 2003/0093450 A1 May 15, 2003

(51) Int. Cl.[7] .............................................. G06F 7/00
(52) U.S. Cl. ..................................................... 708/492
(58) Field of Search ............................ 708/492; 380/28

(56) References Cited

U.S. PATENT DOCUMENTS

| | | | |
|---|---|---|---|
| 5,272,661 A | * 12/1993 | Raghavan et al. | 708/492 |
| 5,680,340 A | * 10/1997 | Glover et al. | 708/492 |
| 5,745,398 A | * 4/1998 | Monier | 708/492 |
| 5,787,028 A | 7/1998 | Mullin | 364/746.1 |
| 6,044,390 A | * 3/2000 | Golnabi et al. | 708/492 |
| 6,049,815 A | * 4/2000 | Lambert et al. | 708/492 |

OTHER PUBLICATIONS

Paar, et al., Fast Arithmetic Architectures for Public–Key Algorithms over Galois Fields GF((2n)m), Advances in Cryptography–EUROCRYPT, 1997, W. Fumy, ed., pp363–378.

Paar et al., Fast Arithmetic for Public–Key Algorithms in Galois Fields with Composite Exponents, IEEE Transactions on Computers, vol. 48, Oct., 1999, pp. 1025–1034.

Mastrovito, E., VlSI Designs for Multiplication over Finite Fields GF(2m), Lecture Notes in Computer Science, vol. 357, Berlin: Springer–Verlag, Mar., 1989, pp. 297–309.

Peterson, W., Error–Correcting Codes, The MIT Press, 1961.

Song et al., Low–Energy Digit–Serial/Parallel Finite Field Multipliers, Journal of VLSI Signal Processing 19, Kluwer Academic Publishers, 1998, pp. 150–166.

* cited by examiner

Primary Examiner—Tan V. Mai
(74) Attorney, Agent, or Firm—Lawrence D. Cutter

(57) ABSTRACT

Finite field elements from the Galois field $GF(2^k)$ are represented as polynomials with binary valued coefficients. As such, multiplication in the field is defined modulo an irreducible polynomial of degree k−1. One of the multiplicands is treated in blocks of polynomials of degree n−1 so that the multiplier operates over T cycles where k=nT. If k is not a composite number to start with, higher order terms are added, so that multipliers are now constructable even when k is prime. Since n<k, the construction of the needed multiplier circuits are much simpler. Designers are now provided with an opportunity of easily trading off circuit speed for circuit complexity in an orderly and structured fashion.

4 Claims, 4 Drawing Sheets

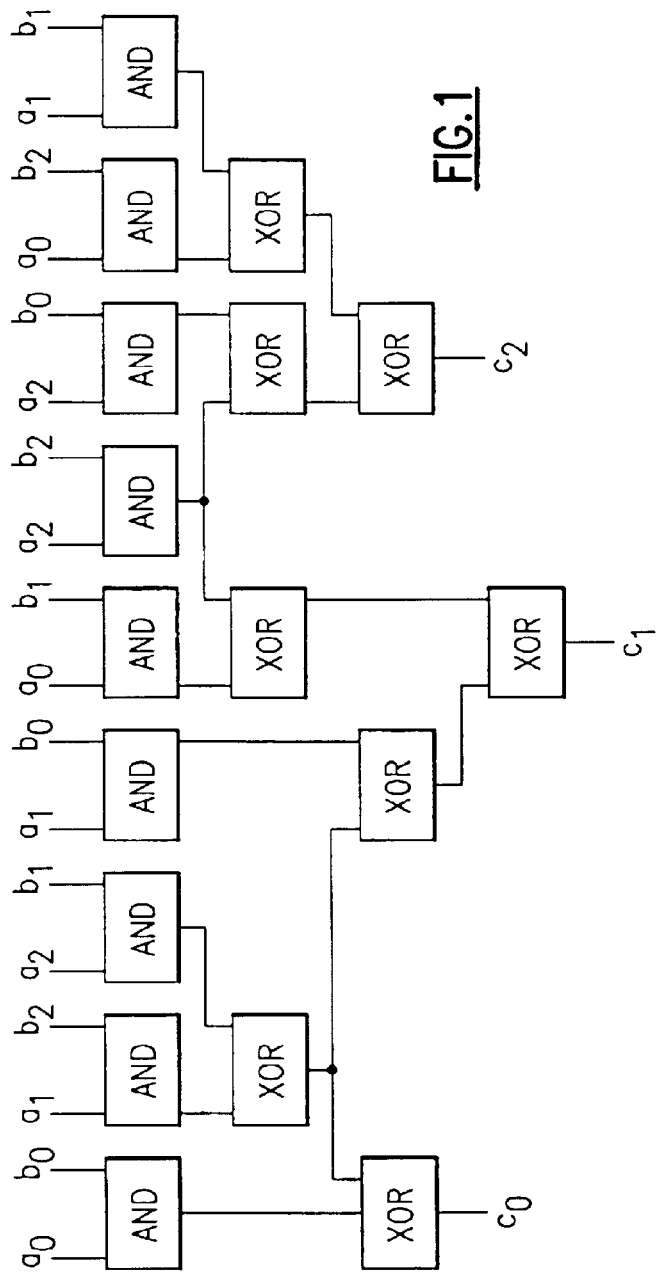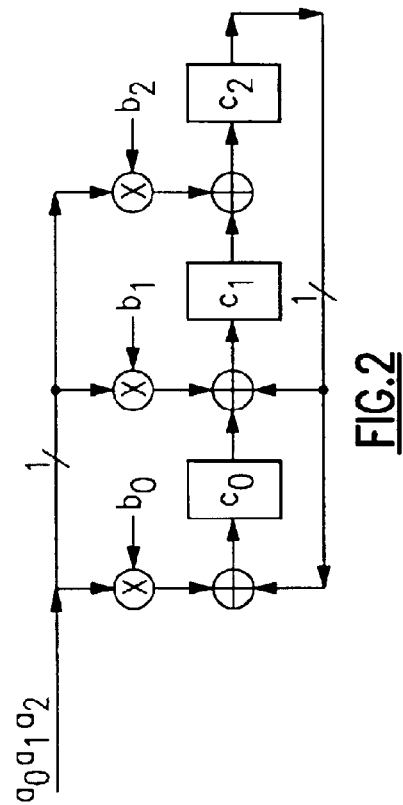

BLOCK-SERIAL FINITE FIELD MULTIPLIERS

BACKGROUND OF THE INVENTION

The present invention is generally directed to a circuit and method for multiplying elements of a finite field. More particularly, the present invention is directed to a process for multiplier design which provides a mechanism for trading off circuit complexity for circuit speed. Even more particularly, the present invention is directed to a mechanism which partitions one of the multiplicands into blocks. Multiplication of these blocks is easier and the size of the blocks is controllable as a design choice with smaller blocks having simpler circuits but requiring a larger number of operation cycles. The opposite is true for larger blocks.

Finite fields have been used extensively in the construction of error correcting codes for many years. Recently, finite fields have also been applied to public-key cryptography using elliptic curves. A major difference in the practical applications of finite fields for error correcting codes and cryptography is that the size of the finite fields is significantly larger in cryptography than in error correcting codes. Accordingly, the implementation of finite field arithmetic for fields with large numbers has been of great interest lately.

For finite fields of characteristic 2, addition is simply carried out by XOR (exclusive OR) operations. Multiplication is more involved. There are two general design approaches. In a bit-parallel design, the product terms are obtained in parallel by a set of AND operations followed by XOR operations and the operations may be carried out in one machine cycle in hardware as described in E. Mastrovito, "VLSI design for multiplication over finite fields $GF(2^m)$," *Lecture Notes in Computer Science*, vol. 357, pp. 297–309, Berlin: Springer-Verlag, March 1989. However, for a large finite field, it may take a considerable number of circuits to implement such a design. A bit-serial multiplier is based on the shift register design concept as described in W. W. Peterson and E. J. Weldon, *Error-Correcting Codes*, second edition, MIT Press, 1972, in which the components of the multiplier are processed sequentially one bit at a time to produce partial products. It takes k cycles to produce the final product if there are k components in each of the field elements. The advantage is that the number of circuits can be greatly reduced.

Recently, a third approach to the design of finite field multipliers called hybrid multiplication has been presented as described in C. Paar, and P. Soria-Rodriguez, "Fast arithmetic architectures for public-key algorithms over Galois fields $GF((2^n)^m)$," *Advances in Cryptography-EUROCRYPT '97*, W. Fumy, ed., pp. 363–378, 1997, and in C. Paar, P. Fleischmann, and P. Soria-Rodriguez, "Fast arithmetic for public-key algorithms in Galois fields with composite exponents," *IEEE Transactions on Computers*, vol. 48, pp. 1025–1034, October, 1999. The hybrid multiplication approach is only applicable if the finite field is composite so that it contains a proper subfield. A finite field of characteristic two is composite if the base two logarithm of the number of field elements is not a prime number. Consider the finite field $GF(2^k)$ with $2^k$ field elements. A field element is represented by a k component vector. If k is composite, say k=nm, then there is a natural way to represent the field elements with m components with each component being an element of the subfield $GF(2^n)$. Hybrid multipliers that can be executed in m=k/n cycles for these composite fields have been presented as described in the articles by Paar et al. listed above.

For cryptographic applications, k is a large number, for example, a number greater than 160 for elliptic curves. It is desirable to design a multiplier that can complete a multiplication operation in less than k cycles and does not require a lot of circuits. Hybrid multiplication provides a solution. However, its application is limited to only special composite finite fields. In addition, cryptography based on composite finite fields is not preferred for security considerations. In particular, the values of k for the five binary finite fields recommended by the US government for digital signature standard published in FIPS PUB 186-2, Jan. 27, 2000, are all primes. If k is a prime, there is no known algorithm that executes a multiplication in greater than one but less than k cycles.

In this application, we present a block-serial method for constructing finite field multipliers for $GF(2^k)$, where k can be either prime or composite. The design is flexible and provides a mechanism for trading off between speed and circuit complexity. One can now always construct a multiplier to execute a multiplication in any number of cycles between 2 and k/2. The present method is particularly applicable to cryptographic systems, especially for applications such as smart cards where circuit space is limited and performance is important. For composite values of k, the present design also offers circuit reduction particularly when compared to the use of hybrid multipliers based on subfields.

SUMMARY OF THE INVENTION

In accordance with a preferred embodiment of the present invention, a finite field multiplier is constructed to multiply together two elements from the finite field $GF(2^k)$. The field elements are represented by binary polynomials a(x) and b(x) and multiplication is carried out modulo an irreducible polynomial p(x) of degree k. The preferred circuit of the present invention includes a first multiplier, a modulo 2 summer, a storage means, and a second multiplier. The first and second multipliers are each much simpler than they would be in alternate designs. The first multiplier multiplies b(x) by $A_j(x)$, where $(T-1) \geq j \geq 0$ and where $A_j(x)$ is a polynomial based on a sequence of n coefficients from the polynomial for a(x) where k is composite and, in fact, is equal to nT. Thus, each $A_j(x)$ is a polynomial of degree n−1 with n coefficients. In fact, if $$a(x) = \sum_{i=0}^{nT-1} a_i x^i = \sum_{j=0}^{T-1} \left( \sum_{i=0}^{n-1} a_{jn+i} x^i \right) x^{jn}$$

then $A_j(x)$ is given by $$\sum_{i=0}^{n-1} a_{jn+i} x^i.$$

The output of the first multiplier is supplied as the first of two inputs to a summer (readily implemented as a plurality of XOR gates). The output of the summer is stored for one of T cycles of operation in a storage means, such as a register. The output of the storage means is supplied to a second multiplier which multiplies the storage means output by $x^n$ and feeds its output to the summer, thus closing a feedback loop.

Accordingly, it is an object of the present invention to provide flexibility in the design and construction of finite field element multipliers.

It is also an object of the present invention to provide multipliers which can operate faster than bit serial designs.

It is yet another object of the present invention to provide multipliers which are less complex, in terms of circuits required than fully parallel designs.

It is a still further object of the present invention to provide binary finite field multipliers even when the field size is not composite, that is, when the base 2 logarithm of the field size is a prime number.

It is an object of the present invention to provide multiplier circuits which are useful in cryptographic applications.

It is yet another object of the present invention to provide multiplier circuits which are useful in error correction applications.

It is a still further object of the present invention to provide multiplier circuits for polynomials wherein the multiplication is modulo an irreducible polynomial.

Lastly, but not limited hereto, it is an object of the present invention to provide multiplier designs which are operable in a wide ranging number of cycles.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 1 is a block diagram of a circuit which implements bit parallel multiplication of two polynomial field elements, $a(x)$ and $b(x)$ modulo $p(x)=x^3+x^2+1$ over GF(2);

FIG. 2 is a block diagram of a circuit which implements the same bit-serial multiplication which is shown in FIG. 1 now being carried out in bit-parallel fashion;

DETAILED DESCRIPTION OF THE INVENTION

Figure 3:
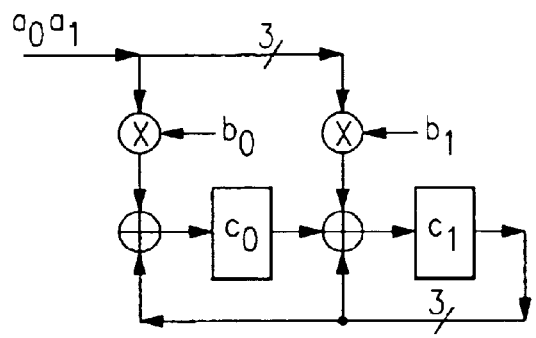
FIG. 3 is a block diagram of a bit serial multiplier for polynomials $a(x)$ and $b(x)$ modulo $p(x)=x^2+x+1$ over $GF(2^3)$.

For a proper understanding of the present invention, consider the field $GF(q^m)$, where q is either 2 or a power of 2. An element of $F=GF(q^m)$ is represented as a polynomial over GF(q) of degree m−1. Thus, $a(x)=a_{m-1} x^{m-1}+\ldots+a_1 x+a_0$, with coefficients $a_1$ in GF(q) F. The element can also be represented by the vector $(a_{m-1}, \ldots, a_1, a_0)$.

The multiplication of two elements $a(x)$ and $b(x)$ in F is the product $c(x)=a(x) b(x)$ modulo $p(x)$, where $p(x)$ is an irreducible polynomial of degree m over GF(q). For example, for explanatory purposes, consider q=2, m=3, $F=GF(2^3)$, and $p(x)=x^3+x+1$. Let $a(x)=(a_2 x^2+a_1 x+a_0)$, $b(x)=(b_2 x^2+b_1 x+b_0)$, and $c(x)=(c_2 x^2+c_1 x+c_0)$. Then $$c(x) = a(x)b(x) \bmod p(x)$$

-continued
$$= a_2 b_2 x^4 + (a_2 b_1 + a_1 b_2)x^3 + (a_2 b_0 + a_1 b_1 + a_0 b_2)x^2 +$$
$$(a_1 b_0 + a_0 b_1)x + a_0 b_0 \bmod x^3 + x + 1$$
$$= (a_2 b_0 + a_1 b_1 + a_0 b_2 + a_2 b_2)x^2 +$$
$$(a_1 b_0 + a_0 b_1 + a_2 b_1 + a_1 b_2 + a_2 b_2)x +$$
$$(a_0 b_0 + a_2 b_1 + a_1 b_2)$$

Note that addition in the binary field GF(2) is the same as XOR. FIG. 1 is a bit-parallel implementation of c(x). It requires 9 AND circuits and 8 2-way XOR circuits. It takes T=1 cycle to produce a product.

A bit-serial multiplier is shown in FIG. 2. Originally, the registers $c_2, c_1$, and $c_0$ are clear. Then the components of a(x) are multiplied (AND operation) by the components of b(x) and are sequentially fed into the registers one clock cycle at a time. The feedback connections at the bottom of the diagram correspond to the last two terms of $p(x)=x^3+x+1$. At the end of three cycles, the registers contains the final product terms of $a(x)b(x) \bmod p(x)$. This multiplier has 3 AND circuits and 4 2-way XOR circuits. It requires T=3 cycles to produce the product.

Now consider $GF(q^m)$ as another example where q=2, m=6, and $p(x)=x^6+x+1$. Following a similar analysis from the previous example, a bit-parallel multiplier producing a product in one cycle requires 36 AND circuits and 35 XOR circuits. A bit-serial multiplier producing a product in T=6 cycles requires 6 AND circuits and 7 XOR circuits.

Since 6 is a composite number, $GF(2^6)$ can be represented as $F=GF(q^2)=GF((2^3)^2)$ with m=2 and $q=2^3$. In this case, F is a composite field containing the subfield $GF(2^3)$. The irreducible polynomial $p(x)=x^2+x+1$ over $GF(2^3)$ may be used to define F. The field elements are represented as polynomials of degree 1 with coefficients in GF(q), where $q=2^3$. A hybrid multiplier (see the cited articles by Paar et al.) based on the composite field is shown in FIG. 3. Here, each of the parameters $a_i, b_1$, and $c_1$ is an element of GF(q) and is a 3-bit vector. Each of the registers $c_1$, and $c_0$ is actually a 3-bit register. The multiplication of $a_1$ and $b_j$ in FIG. 3 represents the circuits shown in FIG. 1. The total number of AND circuits is 2×9=18. The number of 2-way XOR count is (2×8)+(3×3)=25. It takes T=2 cycles to produce a product. A block-serial multiplier, in accordance with the present invention, is presented below and is seen to require 18 AND circuits and 23 XOR circuits with T=2. A comparison of performance and circuits is shown in the following table:

| Method | Clock Cycles | AND Circuits | XOR Circuits |
| --- | --- | --- | --- |
| Bit Parallel | 1 | 36 | 35 |
| Hybrid | 2 | 18 | 25 |
| Block serial | 2 | 18 | 23 |
| Bit Serial | 6 | 6 | 7 |

Figure 4:
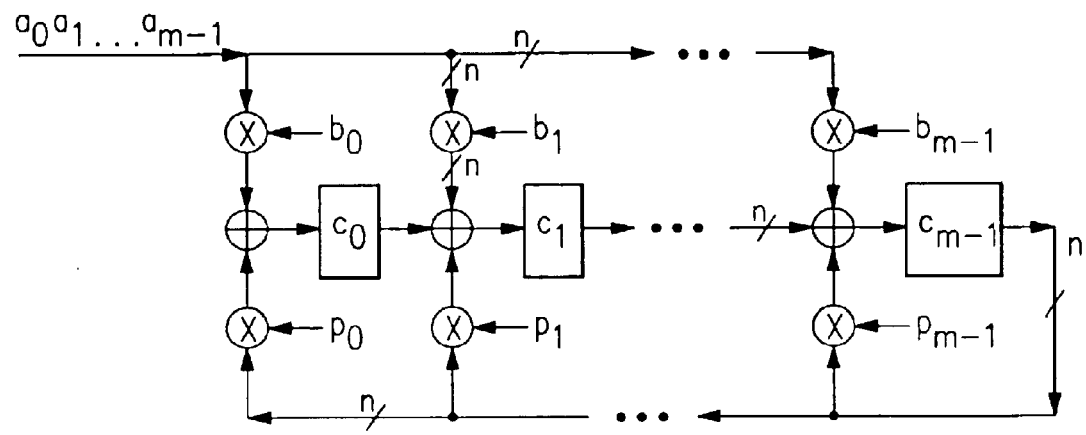
FIG. 4 is a block diagram of a bit serial multiplier for polynomials $a(x)$ and $b(x)$ modulo $p(x)$ over $GF(2^n)$ which is a more general structure than that shown in FIG. 3.

A general hybrid multiplier for field elements in $GF(q^m)$ with $q=2^n$ is shown in FIG. 4.

Attention is now specifically directed to block-serial multipliers. We do not consider whether a finite field contains an extension of the binary field GF(2) as a subfield. We represent elements of $GF(2^k)$ in k-bit binary vectors. To compute $a(x)b(x) \bmod p(x)$, the present process divides a(x) into T blocks. The size n of each block is determined by the smallest of the integers greater than or equal to k divided by T. If k is not a multiple of T, the high-order block is padded with (nT−k) zeros at the high-order positions. The set of T blocks representing a(x) is sequentially multiplied by b(x) and stored in a register with feedback connections. It takes T clock cycles to produce a product. The cases of T=1 and T=k reduce to bit-parallel and bit-serial finite field multiplication, respectively.

Let $a(x)=A_0(x)+A_1(x)x^n+\ldots+A_{T-1}(x)x^{(T-1)n}$, where the polynomials $A_0(x), A_1(x), \ldots, A_{T-1}(x)$ are of degree n−1. In general, if $$a(x) = \sum_{i=0}^{nT-1} a_i x^i,$$

then it can be considered in T blocks as $$\sum_{j=0}^{T-1}\sum_{i=0}^{n-1} a_{jn+i} x^{jn+i} = \sum_{j=0}^{T-1} A_j(x) x^{jn}$$

where $$A_j(x) = \sum_{i=0}^{n-1} a_{jn+i} x^i$$

where $0 \leq j \leq T-1$.

The multiplication of a(x) and b(x) modulo p(x) is expressed as $$c(x) = a(x)b(x) \bmod p(x)$$
$$= A_0(x)b(x) + A_1(x)b(x)x^n + A_2(x)b(x)x^{2n} + \ldots +$$
$$A_{T-1}(x)b(x)x^{(T-1)n} \bmod p(x)$$
$$= ((\ldots(A_{T-1}(x)b(x)x^n + A_{T-2}(x)b(x))x^n + \ldots +$$
$$A_1(x)b(x))x^n + A_0(x)b(x) \bmod p(x)$$

Figure 5:
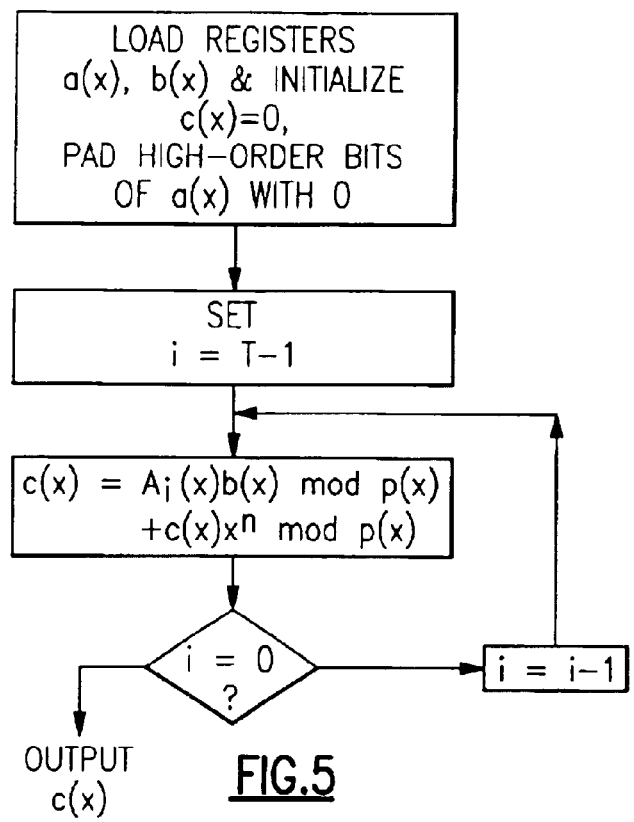
FIG. 5 is a flowchart indicating the structure of block serial multiplication.
Figure 6:
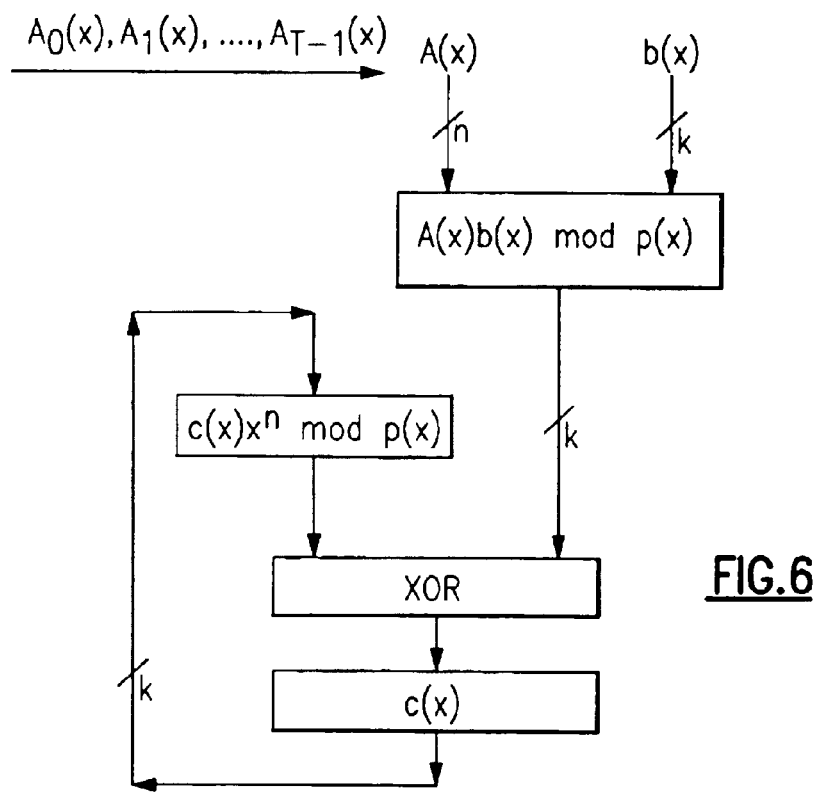
FIG. 6 is a block diagram of a circuit for block-serial multiplication in accordance with the present invention.

The product is the sum of T terms and each term involves the multiplication of a degree n−1 polynomial and a degree k polynomial. Basic hardware is provided herein to perform three functions: multiplication of A(x)b(x) mod p(x), where A(x) is a polynomial of degree n−1, addition of two k-bit polynomials, and multiplication of a degree k polynomial by $x^n$ modulo p(x). The polynomials $A_0(x), A_1(x), \ldots, A_{T-1}(x)$ are fed into the basic hardware sequentially in T cycles to compute the final product c(x). A flow chart for the multiplication algorithm is shown in FIG. 5 and a block diagram for hardware implementation is shown in FIG. 6, where c(x) is an accumulator with XOR circuits between registers to perform polynomial additions as illustrated in the next example.

Consider as a further example, the situation in which k=6, T=2, and $p(x)=x^6+x+1$. We have n=k/T=3. Polynomial a(x) is divided into two groups of 3 bits as $a(x)=A_0(x)+A_1(x) x^3$, where $A_0(x)$ and $A_1(x)$ are of degree 2. The multiplication of a degree k polynomial b(x) by a degree n−1 polynomial is implemented in parallel. Let $A(x)=a_0+a_1 x+a_2 x^2$. We have $$d(x) = A(x)b(x) \bmod p(x)$$
$$= A(x)(b_0 + b_1 x + b_2 x^2 + b_3 x^3 + b_4 x^4 + b_5 x^5) \bmod p(x)$$

-continued
$$= d_0 + d_1 x + d_2 x^2 + d_3 x^3 + d_4 x^4 + d_4 x^4 + d_5 x^5$$
$$= a_0 b_0 + a_1 b_5 + a_2 b_4 +$$
$$(a_0 b_1 + a_1 b_0 + a_1 b_5 + a_2 b_4 + a_2 b_5)x +$$
$$(a_0 b_2 + a_1 b_1 + a_2 b_0 + a_2 b_5)x^2 +$$
$$(a_0 b_3 + a_1 b_2 + a_2 b_0)x^3 + (a_0 b_4 + a_1 b_3 + a_2 b_2)x^4 +$$
$$(a_0 b_5 + a_1 b_4 + a_2 b_3)x^5$$

Thus, A(x)b(x) mod p(x) can be implemented using 18 AND circuits and 14 2-way XOR circuits (note that the XOR of $a_1 b_5$ and $a_2 b_4$ is shared between $d_0$ and $d_1$ terms). The function $c(x)x^n$ mod p(x) is equal to $$c(x)x^3 \bmod p(x) = (c_0 + c_1 x + c_2 x^2 + c_3 x^3 + c_4 x^4 + c_5 x^5)x^3 \bmod x^6 + x + 1$$
$$= c_3 + (c_3 + c_4)x + (c_4 + c_5)x^2 + (c_0 + c_5)x^3 + c_1 x^4 + c_2 x^5$$

Figure 7:
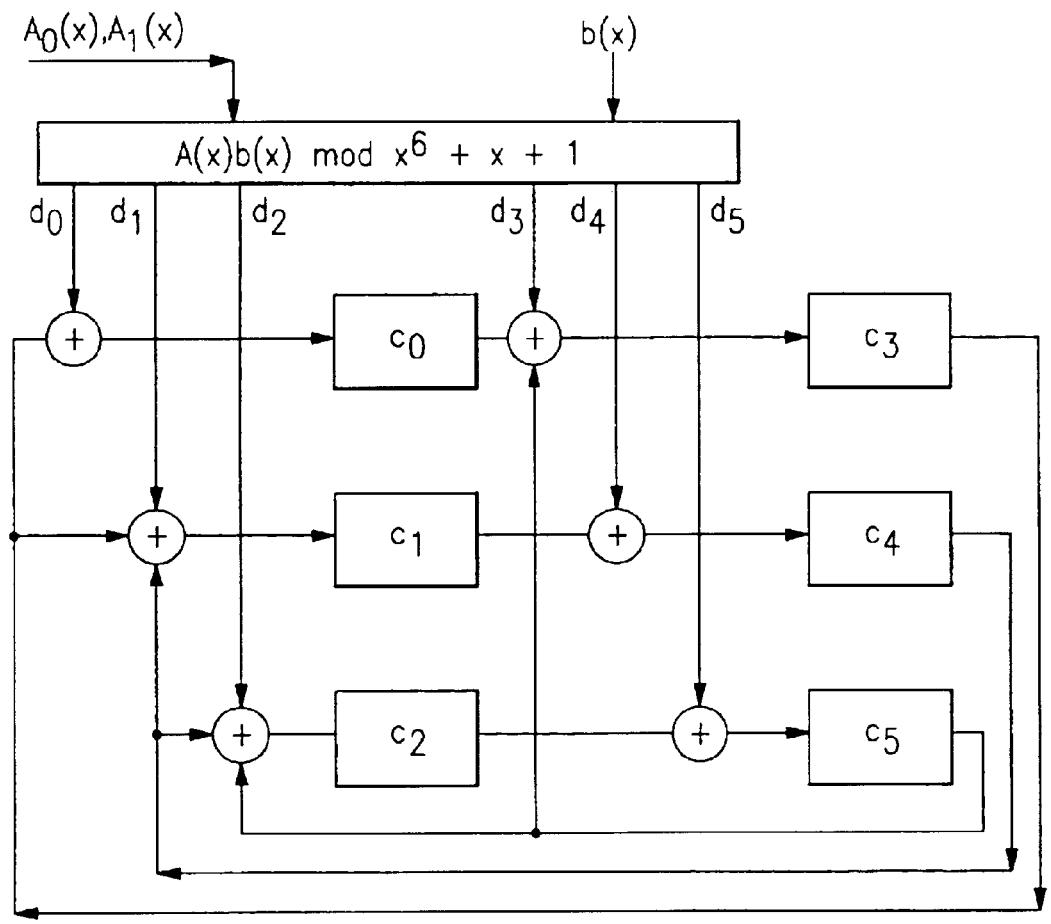
FIG. 7 is a block diagram of a block-serial multiplier of $a(x)$ and $b(x)$ modulo $p(x)=x^6+x+1$.

Thus, the multiplier in FIG. 6 becomes FIG. 7 for this example. It requires 18 AND circuits and 14+9=23 two-way XOR circuits. As compared to the hybrid multiplier based on the subfield $GF(2^3)$, the multiplier in FIG. 7 has 2 fewer XOR circuits. Consider an example of a larger finite field $F=GF(2^{15})$ that contains $GF(2^3)$ as a subfield. A hybrid multiplier based on the subfield with $p(x)=x^5+x^2+1$ requires 45 AND circuits and 58 XOR circuits. The block serial multiplier based on $p(x)=x^{15}+x+1$ requires 45 AND circuits and 39 XOR circuits. Both multipliers take 5 cycles to produce a product. The block-serial multiplier requires fewer XOR circuits than the hybrid multiplier. Since there are only two proper subfields, namely $GF(2^3)$ and $GF(2^5)$, aside from GF(2), a hybrid multiplier can only be designed to produce a product in 3 or 5 clock cycles. The block-serial multiplier design is more flexible. It can be designed to produce a product in 2, 3, 4, 5, 6, 7 or 8 cycles. For example, to design a block serial multiplier that produces a product every 2 clock cycles, the multiplier a(x) is divided into two blocks of size 8. That is, n=8 and $a(x)=A_0(x)+A_1(x) x^n$, where both $A_0(x)$ and $A_1(x)$ are of degree 7. Since there are only 15 bits in a field element, the highest order term, i.e., the coefficient of $x^7$ term, of $A_1(x)$ is set to zero. There is no hybrid multiplier that produces a product in 2 cycles.

The new multiplication design can be applied to the finite field $GF(2^k)$ regardless of the value of k.

The coefficients of $c(x)x^3$ mod $x^6+x+1$ can be expressed as $$\begin{bmatrix} 0 & 0 & 0 & 1 & 0 & 0 \\ 0 & 0 & 0 & 1 & 1 & 0 \\ 0 & 0 & 0 & 0 & 1 & 1 \\ 1 & 0 & 0 & 0 & 0 & 1 \\ 0 & 1 & 0 & 0 & 0 & 0 \\ 0 & 0 & 1 & 0 & 0 & 0 \end{bmatrix} \begin{bmatrix} c_0 \\ c_1 \\ c_2 \\ c_3 \\ c_4 \\ c_5 \end{bmatrix}$$

where the column vectors of the 6×6 matrix represents ($x^3$, $x^4$, $x^5$, $x^6$, $x^7$, $x^8$) mod $x^6+x+1$. In the general case, $c(x)x^n$ mod p(x) can be expressed as the product of a matrix M and a column vector containing the coefficients of c(x) as its components. The columns of the matrix M correspond to ($x^n$ mod p(x), $x^{n+1}$ mod p(x), ..., $x^{n+k-1}$ mod p(x)). Matrix M can be mapped directly into XOR circuits for the logic block $c(x)x^n$ mod p(x) in FIG. 6.

Accordingly, it is seen that all of the objects stated above have been met in the system, circuits, and methods of the present invention. In particular, it is seen that finite field element multipliers can be built for any field of the form $GF(2^k)$ even if k is not a composite number. Furthermore, it is seen that the present technique of considering one of the multiplicands in block form permits circuits to operate over T=1 cycles, T=k cycles, and various cycles in between, where k=nT. The blocks of one of the multiplicands is readily seen to be representable by a polynomial of degree n−1 with n independent coefficients. Since n<k, multiplier design is simplified.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A circuit for performing multiplication of two elements from a finite Galois field $GF(2^k)$ wherein said elements are represented by polynomials a(x) and b(x) and multiplication is carried out modulo an irreducible polynomial p(x) of degree k, said circuit comprising:

a first multiplier modulo p(x) for $A_j(x)$ with $(T-1) \geq j \geq 0$ and b(x), where $A_j(x)$ is a polynomial of degree n−1 of the form $$\sum_{i=0}^{n-1} a_{jn+i} x^i$$

where $\alpha_{jn+i}$ is the coefficient for the $x^{jn+i}$ term in the polynomial a(x) and wherein k=nT;

a summer receiving the output from said multiplier;

a storage means for holding the output from said summer for each of T cycles of operation of said circuit;

a second multiplier modulo p(x) for multiplying the current contents of said storage means by $x^n$, the output of said second multiplier also being supplied as an input to said summer.

2. The circuit of claim 1 further including means to supply in sequential order T successive representations of said polynomials $A_j(x)$, $(T-1) \geq j \geq 0$, to said first multiplier $A_{T-i}(x)$ being presented first.

3. The circuit of claim 1 wherein said first multiplier multiplies n bit wide representations of $A_j(x)$ with k bit wide representations of b(x).

4. A circuit for performing multiplication of two elements from a finite Galois field $GF(2^k)$ wherein said elements are represented by polynomials a(x) and b(x) and multiplication is carried out modulo an irreducible polynomial p(x) of degree k, said circuit comprising:

a first multiplier modulo p(x) for $A_j(x)$ with $(T-1) \geq j \geq 0$ and b(x), where $A_j(x)$ is a polynomial of degree n−1 of the form $$\sum_{i=0}^{n-1} a_{jn+i} x^i$$

where $\alpha_{jn+i}$ is the coefficient for the $x^{jn+i}$ term in the polynomial a(x) and wherein k is not originally equal to nT but where higher order terms in a(x) are added in sufficient number with zero coefficients to insure that k=nT;

a summer receiving the output from said multiplier;

a storage means for holding the output from said summer for each of T cycles of operation of said circuit;

a second multiplier modulo p(x) for multiplying the current contents of said storage means by $x^n$, the output of said second multiplier also being supplied as an input to said summer.

* * * * *